United States Patent Office 3,254,044
Patented May 31, 1966

3,254,044
AQUEOUS VINYLIDENE CHLORIDE POLYMER LATEXES AND A PROCESS FOR PREPARING THE SAME
Roland E. Gunderman, Clare, Mich., and Roland G. Lindsey, Springfield, Pa., assignors to The Dow Chemical Company, Midland, Mich., a corporation of Delaware
No Drawing. Filed June 5, 1961, Ser. No. 114,639
7 Claims. (Cl. 260—29.6)

The present invention is a contribution to the art of aqueous latexes of interpolymers, particularly to those of vinylidene chloride interpolymers. More particularly, the invention relates to such latexes which, especially when formulated with fillers, extenders, and other particulate additives, exhibit improved stability to storage, mechanical shear, polyvalent metal ions, and other similar forces and conditions.

The chloroethylene polymers, particularly those containing characterizing amounts of 50 percent or more vinylidene chloride, are known to possess a community of properties making them well adapted for a wide diversity of end uses. Among those properties may be mentioned non-flammability, low permeability, chemical inertness, high impact and tensile strengths, and other similar physical and chemical properties. In latex form these polymers are known to possess good binding power for fillers, pigments, and similar particulate materials. However, it is equally well known that such latexes are somewhat sensitive to environmental and extraneously applied forces, such as mechanical shear, polyvalent metal ions, storage, and the like. This sensitivity is usually more pronounced with latexes that have been formulated with solid additives. The sensitivity, although not unique to this particular class of latexes, is, nevertheless, a significant factor in evaluating the latexes for proposed commercial outlets. The latex art in general has approached a stability problem by incorporation of a small amount of a wetting agent into the latex shortly after completion of polymerization. Although this approach frequently is successful, it many times creates new problems, such as water sensitivity in the end product and foaming.

With the above problems in mind, it is the principal object of this invention to provide new aqueous latexes of interpolymers composed of at least 50 percent vinylidine chloride, said latexes characterized in having improved inherent stability while retaining the inherent properties of vinylidene chloride polymers.

It is a further object to provide such a class of new latexes which have such stability without the need for resorting to additional wetting agent included in the latex.

It is a still further object to provide a process whereby these new polymer latexes are prepared.

It has now been found that the above and related objects are achieved with an aqueous latex having individual polymer particles composed of a core of an interpolymer of at least 50 percent by weight of vinylidene chloride with any remainder of at least one monoethylenically unsaturated comonomer and an encompassing sheath composed essentially of the homopolymer of an alkyl alkacrylate having from 1 to 4 carbon atoms in the alkyl group, the polymer of said sheath making up from about 1 to about 5 percent of the combined total weight of polymer in the particle.

As mentioned, the concept of the present invention is applicable to those latexes of particles having an overall polymer composition of at least about 50 percent vinylidene chloride based on the total weight of monomers. Any remainder of the core interpolymer is made up of at least one monoethylenically unsaturated comonomer. As monoethylenically unsaturated comonomers, there may be mentioned the vinyl halides, such as vinyl chloride and vinyl bromide; the vinyl esters, such as vinyl acetate and vinyl propionate; the vinyl ethers, such as vinyl methyl ether; acrylic monomers, such as acrylic and methacrylic acid, ethyl acrylate, butyl acrylate, 2-ethylhexyl acrylate, and arcylonitrile. Other comonomers interpolymerizable with vinylidene chloride will be well known to those skilled in the art.

As the alkyl alkacrylate to be employed in the sheath, there may be mentioned methyl methacrylate, ethyl methacrylate, butyl methacrylate, ethyl ethacrylate, and butyl ethacrylate. Other suitable alkyl alkacrylates will be known to the skilled worker.

It should be understood that the present invention depends both on the chemical composition of the interpolymer making up the latex particle and on its particulate architecture. In effect, each latex particle consists of a core of the interpolymer of vinylidene chloride and the monoethylenically unsaturated comonomer with an encompassing sheath substantially of the homopolymer of the alkacrylate. Between the core and the sheath and in the sheath itself there may be a conglomerate of different polymer entities resulting from the interpolymerization of residual vinylidene chloride and comonomer with the alkyl alkacrylate. The unusual stability of the latexes is believed to be caused by the surface effect of polyalkyl alkacrylate or of a polymeric material containing polyalkyl alkacrylate facing the continuous phase of the latex. At the same time, the core of each particle contains the preponderance of the volume and weight of polymer making up the latex so that the properties of the articles fabricated from the latex to a principal extent depend upon and are derived from the core material. To achieve these advantageous benefits, the alkyl alkacrylate should constitute from about 1 to about 5 percent of the combined weight of monomers making up the polymeric material of the latex particles. When there is substantially less than one percent, too few of the latex particles are ensheathed with the polyalkyl alkacrylate to achieve the desired results. When more than about 5 percent is used, the polyalkyl alkacrylate exerts a significant and, for purposes of the present invention, undesirable influence on the properties of the resulting latex particle. Within the desired range, the particle retains the inherent properties of the vinylidene chloride interpolymer and has the desired enhanced stability. This combination of a retention of properties of vinylidene chloride polymer with the enhanced latex stability is not achieved by an interpolymer of the same monomeric composition and proportions (that is, of vinylidene chloride, comonomer, and alkyl alkacrylate) but of uniform particle structure.

The latexes are prepared by a particular polymerization sequence employing otherwise conventional emulsion polymerization technology. Emulsion polymerization is well known in the art. In one technique exemplary of the prior technology, the monomeric materials are dispersed into an aqueous phase containing a water-soluble polymerization catalyst, such as potassium persulfate, and a surface-active agent capable of emulsifying the monomeric materials in water. Examples of suitable emulsifiers are the soluble salts of long chain alkyl sulfates or sulfonates, petroleum hydrocarbon sulfonates, and the like. The polymerization is usually induced by heating the aqueous emulsion at temperatures of about 30 to 80° C. with agitation. After polymerization is substantially complete, the latex is filtered to remove any pre-coagulum.

The process of the present invention departs from the conventional emulsion polymerization as exemplified above by involving an addition of a monomeric material into a polymerizing system at a point in conversion when the initial monomers are almost completely converted to copolymer. Initially, a conventional emulsion polymerization is conducted employing vinylidene chloride and the one or more monoethylenically unsaturated comonomers. However, when the conversion of that monomeric material to polymer has reacted from about 80 to preferably about 95 percent, the alkyl alkacrylate monomer is incorporated into the system and the polymerization continued on to completion.

It has been found to be necessary to attain the stated objectives that the conversion of monomer to polymer in the first procedural sequence be within the stated range. When the conversion of the first polymerization is carried beyond about 95 percent, there is usually an increase in precoagulum and other undesirable effects occur. If the alkyl alkacrylate is added to the first polymerization when there has been less than about 80 percent conversion of monomer to polymer, there is generally too much residual vinylidene chloride and comonomer so that the alkyl alkacrylate is diluted with those monomers and the sheath resulting from the second polymerization contains less than the requisite amount of polyalkyl alkacrylate. In addition, when the conversion is less than about 80 percent, the alkyl alkacrylate diffuses into and plasticizes the latex particle. The so-softened particles have an increased tendency to agglomerate and form excessive precoagulum. Within the desired conversion range, the required sheath is formed.

It has also been found necessary to the attainment of the objectives that a small amount of a particular class of emulsifiers which are soluble in the alkyl alkacrylate monomer should be included in the increment of alkyl alkacrylate added to the latex resulting from the first polymerization. When this emulsifier is not included, the alkyl alkacrylate monomer has a strong tendency to diffuse into the latex particles where it acts as a plasticizer softening the particles, rather than forming the polymeric sheath. Those softened particles tend to agglomerate, forming excess precoagulum. This plasticizing tendency does not occur with alkyl alkacrylate to which has been added a soluble emulsifier. That emulsifier seems to retain the alkyl alkacrylate on the surface of the particles. Representative of useful emulsifiers is the dioctyl ester of sulfosuccinic acid. Others will be known to the skilled worker. As should be apparent, the solubility of the emulsifier in the alkyl alkacrylate may be temperature dependent. Simple solubility experiments will demonstrate whether requisite solubility is had by any particular emulsifier.

It has also been found that a small amount of a water-soluble alkali metal persulfate catalyst should preferably also be added with the alkyl alkacrylate monomer. When the added catalyst consists only of the alkali metal persulfate, the resulting latex will evidence some increase in stability. However, when the added catalyst is of a persulfate redox type, ultimate increases in stability are attained. As a consequence, such redox catalytic systems, exemplified by potassium persulfate/potassium bisulfite, are preferred.

Following the completion of the second polymerization the latex may be demonomerized, filtered, and subjected to the other treatments conventional in the latex art. Procedures and techniques for achieving these ends will be well known.

Post stabilizers may be added to the latex to secure special effects. Thus, where the latex is to be used as a binder for particulate materials, it may be desirable to incorporate additional wetting agents to enhance the wetting of the particles of filler or extender by the latex. This additional wetting agent may also confer additional stability on the latex. Thickeners may be incorporated in the latex where the end use demands a latex of such reological properties. Colorants, such as dyes and pigments, may be included. Light and heat stabilizers and antioxidants may be added as may fillers. Small amounts of other polymer latexes, such as that resulting from the emulsion polymerization of styrene and butadiene, may be added to extend the latex.

The present inventive concept is operable with latexes of almost any individual particle size or particle size distribution. The particle size of most latexes of chloroethylenic monomers will fall in the range of from about 500 to about 4,000 angstrom units. Latexes having particle sizes significantly outside of this range will have less mechanical and storage stability than those within the range. However, the present invention will provide a latex having increased stability over a latex of unmodified particles, assuming the same particle size for each.

It is also known that latexes which are to be used in forming continuous, coherent articles, such as films, should preferably contain from about 20 to about 55 percent by weight of non-volatile polymeric solids. The same range of solids content is equally practical for those latexes to be used as a binder for particulate materials. When less than about 20 percent by weight of polymer solids are present in the latex, the latexes are uneconomical to prepare in the first instance, require extensive dewatering following fabrication, and in general are commercially unattractive. Latexes having appreciably more than about 55 percent by weight of polymer solids are difficult to prepare without excessive precoagulum and are somewhat sensitive to mechanical shearing forces. The present invention, however, is operable with latexes of any commercially accepted solids content.

The present invention permits the preparation of film-forming latexes of chloroethylenic polymers which are stable to mechanical shear, to storage, to polyvalent metal ions, and to other forces of similar nature. These latexes permit a great extension of the possible end uses for which such latexes may be used.

The benefits and advantages which derive from the present latexes will be more apparent from the illustrative examples wherein all parts and percentages are by weight.

*Example 1*

100 parts of a monomeric material composed of 75 parts vinylidene chloride, 20 parts vinyl chloride, and 5 parts ethyl acrylate is dispersed in 82 parts of an aqueous phase at a pH of 2.5 to 4 and which contains 0.4 part potassium persulfate, 2 parts of the dihexyl ester of sodium sulfosuccinate, and 0.09 part potassium sulfate. The emulsion is maintained at 45° C. and polymerized until the autogenous monomer pressure rises to a maximum and then drops 70 percent from that maximum. At this pressure drop, the conversion of monomers to interpolymer is 94 to 95 percent complete. At that pressure drop 1.64 parts methyl methacrylate containing 0.0164 part of a 40 percent active surfactant blend of an ammonium alkyl benzene sulfonate; a lauryl glycerol sulfate; a fatty alkanolamide; and alcohol and sold commercially as Joy Liquid Detergent, 0.1 part sodium bisulfite as a 3 percent water solution, and 0.0002 part ferric ion as a 10 percent water solution are added. The temperature is then raised to 55° C. and maintained for 3 hours. At this time, the conversion of all monomers to polymer is about 98 to 99 percent complete. The latex is evacuated to remove residual monomer and then there is added to the latex as post stabilizers 3.57 percent Triton X-200, a sodium salt of an alkyl aryl polyether sulfonate, and 5 percent based on the latex solids of an alkyl aryl polyether resulting from the condensation of di-tert-butylphenol with ethylene oxide.

*Example 2*

A latex was prepared by dispersing a monomeric material composed of 75 percent vinylidene chloride, 20 percent vinyl chloride, and 5 percent ethyl acrylate into an aqueous phase as in Example 1. Polymerization was initiated and maintained at 45° C. until substantially complete. The latex was evacuated to remove residual monomer and filtered to remove precoagulum. The latex was then split into two divisions and post formulated as follows: (a) to one sample there was added 4 percent of the alkyl aryl polyether identified in Example 1 and (b) to the second sample there was added 4 percent of the alkyl aryl polyether and 1 percent of Triton X–200.

*Example 3*

The latexes of Examples 1 and 2 were tested for stability in a Portland cement mortar mix. In this test the formulated latex was weighed out and placed in the mixer. To the latex there was added 94 parts of Portland cement and this time recorded as the beginning of mixing. 195 parts of sand was weighed in and enough water at 80° F. to bring the mix to the desired consistency. The mixture was then run for one hour or until the cement started to thicken and set. This elapsed time was recorded as the cement stability of the latex.

In the above test it was found that the latex of Example 2(a) ran for 19 minutes, the latex of Example 2(b) ran for 17 minutes, and the latex of Example 1 was still uneffected after 60 minutes of operation. From these results the inherent stability of the latex is vividly evident.

Similar contrast in properties as noted in the preceding paragraph is observed when the latex of Example 1 is compared with a latex prepared by a conventional batchwise emulsion polymerization technique from the same monomeric ingredients and proportions and the same conditions of solids, temperature, agitation, and catalysis but wherein all of the monomer is incorporated into the polymerization at the commencement of polymerization.

What is claimed is:

1. An aqueous latex wherein substantially each individual polymer particle is composed of (1) a core of an interpolymer of at least 50 percent by weight of vinylidene chloride with the remainder of at least one monoethylenically unsaturated comonomer and (2) an encompassing sheath composed essentially of the homopolymer of an alkyl alkacrylate having from 1 to 4 carbon atoms in the alkyl group, the polymer of said sheath constituting from about 1 to about 5 percent of the combined total weight of polymer in the particle.

2. The latex claimed in claim 1 wherein said core is composed of from about 80 to 95 percent of the total of said vinylidene chloride and said comonomer and said sheath is a mixture of interpolymers of said alkyl alkacrylate plus the residue of vinylidene chloride and said monoethylenically unsaturated comonomer and the homopolymer of said alkyl alkacrylate.

3. The latex claimed in claim 1 characterized by containing from 20 to about 55 percent by weight of polymer solids.

4. The latex claimed in claim 1 wherein said interpolymer of said core is composed of at least 50 percent vinylidene chloride with the remainder of vinyl chloride and an alkyl acrylate containing from 1 to 8 carbon atoms in the alkyl group.

5. The latex claimed in claim 4 wherein said interpolymer is composed of 75 percent vinylidene chloride, about 20 percent vinyl chloride, and about 5 percent ethyl acrylate with the said surface layer composed of about 2 percent of the weight of total monomers of polymethyl methacrylate.

6. The process for preparing stable latexes comprising the dispersion of a monomeric material composed of at least 50 percent vinylidene chloride with the remainder of at least one monoethylenically unsaturated comonomer in an aqueous phase, subjecting said dispersion to thermal and catalytic conditions known to cause polymerization until from about 80 to 95 percent conversion of monomers to polymers has been completed, then introducing into said dispersion from 1 to about 5 percent by weight of combined total weight of monomers of an alkyl alkacrylate having from 1 to 4 carbon atoms in the alkyl group, an emulsifier soluble in said alkyl alkacrylate, and a redox catalyst and continuing the polymerization to completion.

7. The process claimed in claim 6 wherein said monomeric material is composed of about 75 percent vinylidene chloride, about 20 percent vinyl chloride, and about 5 percent ethyl acrylate.

References Cited by the Examiner

UNITED STATES PATENTS

| | | | |
|---|---|---|---|
| 2,711,400 | 6/1955 | Harrison et al. | 260—879 |
| 2,746,944 | 5/1956 | Naps et al. | 260—884 |
| 2,849,419 | 8/1958 | Hayes et al. | 260—884 |
| 2,894,927 | 7/1959 | Elder et al. | 260—884 |
| 3,102,050 | 8/1963 | Canterino et al. | 117—100 |

FOREIGN PATENTS 866,895    5/1961    Great Britain.

MURRAY TILLMAN, *Primary Examiner.*

LEON J. BERCOVITZ, *Examiner.*

H. L. SATZ, W. J. BRIGGS, SR., *Assistant Examiners.*